United States Patent
Melick et al.

(10) Patent No.: US 7,150,400 B2
(45) Date of Patent: Dec. 19, 2006

(54) METHOD AND APPARATUS FOR CAPTURING AND DECODING AN IMAGE OF A REMOTELY LOCATED BAR CODE

(75) Inventors: Bruce D. Melick, Cedar Rapids, IA (US); David M. Snyder, Cedar Rapids, IA (US); Leslie D. Baych, Cedar Rapids, IA (US); Paul R. Staman, Amana, IA (US)

(73) Assignee: Tripletail Ventures, Inc., Cedar Rapids, IA (US)

( * ) Notice: Subject to any disclaimer, the term of this patent is extended or adjusted under 35 U.S.C. 154(b) by 0 days.

(21) Appl. No.: 11/131,853

(22) Filed: May 18, 2005

(65) Prior Publication Data

US 2005/0258250 A1    Nov. 24, 2005

Related U.S. Application Data

(60) Provisional application No. 60/572,140, filed on May 18, 2004.

(51) Int. Cl.
G02B 26/10 (2006.01)
G06K 19/06 (2006.01)
G06K 7/10 (2006.01)
G06K 9/22 (2006.01)

(52) U.S. Cl. .................................. 235/462.25
(58) Field of Classification Search ........... 235/462.25, 235/462.4, 472, 470, 462.46, 462.45
See application file for complete search history.

(56) References Cited

U.S. PATENT DOCUMENTS

| | | |
|---|---|---|
| 4,175,693 A | 11/1979 | Nakanishi et al. |
| 4,352,012 A | 9/1982 | Verderber et al. |
| 4,481,412 A | 11/1984 | Fields |
| 4,511,259 A | 4/1985 | Horiuchi |
| 4,731,525 A | 3/1988 | Hice |
| 4,752,675 A | 6/1988 | Zetmeir |
| 4,791,281 A | 12/1988 | Johnson et al. |
| 4,877,948 A | 10/1989 | Krueger |
| 4,902,883 A | 2/1990 | Poland |
| 5,113,445 A | 5/1992 | Wang |
| 5,159,180 A | 10/1992 | Feiler |
| 5,159,635 A | 10/1992 | Wang |
| 5,178,417 A | 1/1993 | Eshoo |
| 5,227,893 A | 7/1993 | Ett |
| 5,245,655 A | 9/1993 | Buhn et al. |
| 5,315,093 A | 5/1994 | Stewart |
| 5,331,137 A | 7/1994 | Swartz |
| 5,363,214 A | 11/1994 | Johnson |
| 5,369,571 A | 11/1994 | Metts |
| 5,379,345 A | 1/1995 | Greenberg |

(Continued)

FOREIGN PATENT DOCUMENTS

JP    406089362 A    3/1994

OTHER PUBLICATIONS

"PSC Momentum Scanner and Handspring Visor" http://www.pscnet.com/momenvsr.html, Dec. 27, 2000: 2 pages.

(Continued)

*Primary Examiner*—Michael G. Lee
*Assistant Examiner*—Edwyn Labaze
(74) *Attorney, Agent, or Firm*—McKee, Voorhees & Sease, P.L.C.

(57) ABSTRACT

A method for remotely decoding a bar code includes capturing an image of a bar code using a camera, transmitting the image of the bar code across a network, receiving the image of the bar code at a remote location on the network, reproducing the image of the bar code at the remote location to provide a reproduced image of the bar code, and scanning and decoding the reproduced image of the bar code.

16 Claims, 1 Drawing Sheet

U.S. PATENT DOCUMENTS

| | | | |
|---|---|---|---|
| 5,420,943 | A | 5/1995 | Mak |
| 5,436,437 | A | 7/1995 | Ho |
| 5,451,760 | A | 9/1995 | Renvall |
| 5,453,600 | A | 9/1995 | Swartz |
| 5,455,414 | A | 10/1995 | Wang |
| 5,468,945 | A | 11/1995 | Huggett et al. |
| 5,489,763 | A | 2/1996 | Conrad et al. |
| 5,490,217 | A | 2/1996 | Wang et al. |
| 5,506,697 | A | 4/1996 | Li et al. |
| 5,563,399 | A | 10/1996 | Wang |
| 5,579,537 | A | 11/1996 | Takahisa |
| 5,594,230 | A | 1/1997 | Waite et al. |
| 5,602,377 | A | 2/1997 | Beller et al. |
| 5,644,408 | A | 7/1997 | Li et al. |
| 5,659,164 | A | 8/1997 | Schmid et al. |
| 5,665,953 | A | 9/1997 | Mazzamuto et al. |
| 5,682,030 | A | 10/1997 | Kubon |
| 5,684,288 | A | 11/1997 | Renvall |
| 5,760,382 | A | 6/1998 | Li et al. |
| 5,781,914 | A | 7/1998 | Stork et al. |
| 5,805,152 | A * | 9/1998 | Furusawa ................ 715/500.1 |
| 5,825,009 | A | 10/1998 | Schmid et al. |
| 5,841,116 | A | 11/1998 | Lewis |
| 5,848,202 | A | 12/1998 | D'Eri et al. |
| 5,848,426 | A | 12/1998 | Wang et al. |
| 5,872,589 | A | 2/1999 | Morales |
| 5,939,699 | A | 8/1999 | Perttunen et al. |
| 5,974,202 | A | 10/1999 | Wang et al. |
| 5,979,762 | A | 11/1999 | Bianco |
| 6,002,491 | A | 12/1999 | Li et al. |
| 6,865,284 | B1 | 12/1999 | Mahoney et al. |
| 6,015,088 | A | 1/2000 | Parker et al. |
| 6,015,167 | A | 1/2000 | Savino et al. |
| 6,024,284 | A | 2/2000 | Schmid et al. |
| 6,024,289 | A | 2/2000 | Ackley |
| 6,031,621 | A | 2/2000 | Binder |
| 6,036,094 | A | 3/2000 | Goldman et al. |
| 6,039,252 | A | 3/2000 | Maltsev |
| 6,041,374 | A | 3/2000 | Postman et al. |
| 6,056,195 | A | 5/2000 | Spain |
| 6,082,620 | A | 7/2000 | Bone, Jr. |
| 6,095,418 | A | 8/2000 | Swartz et al. |
| 6,102,289 | A | 8/2000 | Gabrielson |
| 6,108,656 | A | 8/2000 | Durst et al. |
| 6,138,906 | A | 10/2000 | DeMayo |
| 6,149,059 | A | 11/2000 | Ackley |
| 6,189,009 | B1 | 2/2001 | Stratigos et al. |
| 6,230,143 | B1 | 5/2001 | Simons et al. |
| 6,260,762 | B1 | 7/2001 | Lohmann |
| 6,299,063 | B1 | 10/2001 | Freeman |
| 6,389,182 | B1 | 5/2002 | Ihara et al. |
| 6,429,776 | B1 | 8/2002 | Allicot et al. |
| 6,464,140 | B1 | 10/2002 | Weigel |
| 6,540,138 | B1 | 4/2003 | Hall et al. |
| 6,540,143 | B1 | 4/2003 | Matsumori |
| 6,568,596 | B1 * | 5/2003 | Shaw ..................... 235/462.01 |
| 6,616,056 | B1 | 9/2003 | Cato |
| 6,631,843 | B1 | 10/2003 | Schuessler |
| 6,666,377 | B1 | 12/2003 | Harris |
| 6,668,293 | B1 | 12/2003 | Chen et al. |
| 6,669,087 | B1 | 12/2003 | Harris |
| 6,674,924 | B1 | 1/2004 | Wright et al. |
| 6,685,094 | B1 * | 2/2004 | Cameron ..................... 235/468 |
| 6,707,581 | B1 | 3/2004 | Browning |
| 6,729,547 | B1 * | 5/2004 | Charlier et al. ........ 235/462.45 |
| 6,749,120 | B1 * | 6/2004 | Hung et al. ............ 235/472.01 |
| 6,758,391 | B1 | 7/2004 | Pickens, III |
| 6,764,009 | B1 | 7/2004 | Melick et al. |
| 6,772,947 | B1 | 8/2004 | Shaw |
| 6,772,950 | B1 * | 8/2004 | He ............................. 235/470 |
| 6,793,127 | B1 | 9/2004 | Alsafadi et al. |
| 6,799,717 | B1 | 10/2004 | Harris |
| 6,826,548 | B1 | 11/2004 | Hungerpiller et al. |
| 6,854,651 | B1 * | 2/2005 | Smith et al. ........... 235/462.01 |
| 6,948,068 | B1 * | 9/2005 | Lawandy et al. ........... 713/176 |
| 2001/0003178 | A1 | 6/2001 | Chen et al. |
| 2001/0006189 | A1 | 7/2001 | Ruby |
| 2001/0011233 | A1 | 8/2001 | Narayanaswami |
| 2001/0030234 | A1 | 10/2001 | Wiklof |
| 2001/0034222 | A1 * | 10/2001 | Roustaei et al. ............ 455/403 |
| 2001/0042791 | A1 | 11/2001 | Postlewaite |
| 2001/0045461 | A1 | 11/2001 | Schuessler |
| 2001/0054082 | A1 | 12/2001 | Rudolph et al. |
| 2002/0023027 | A1 | 2/2002 | Simonds |
| 2002/0063903 | A1 | 5/2002 | Claviez-Homberg |
| 2002/0074399 | A1 | 6/2002 | Hall et al. |
| 2002/0097426 | A1 | 7/2002 | Gusmano et al. |
| 2002/0105424 | A1 | 8/2002 | Alicot et al. |
| 2002/0165931 | A1 | 11/2002 | Greer et al. |
| 2002/0181804 | A1 | 12/2002 | Simpson et al. |
| 2002/0195495 | A1 * | 12/2002 | Melick et al. ......... 235/462.01 |
| 2003/0009350 | A1 | 1/2003 | Melick et al. |
| 2003/0019935 | A1 | 1/2003 | Giannulli |
| 2003/0019939 | A1 * | 1/2003 | Sellen ................... 235/462.45 |
| 2003/0042312 | A1 | 3/2003 | Cato |
| 2003/0042313 | A1 | 3/2003 | Kahn et al. |
| 2003/0127517 | A1 | 7/2003 | Convelaere et al. |
| 2003/0141368 | A1 | 7/2003 | Pascual et al. |
| 2003/0179908 | A1 | 9/2003 | Mahoney et al. |
| 2003/0182242 | A1 * | 9/2003 | Scott et al. .................... 705/65 |
| 2003/0197062 | A1 | 10/2003 | Shaw |
| 2003/0226885 | A1 | 12/2003 | Harris |
| 2003/0229678 | A1 * | 12/2003 | Wen et al. ................... 709/217 |
| 2003/0230630 | A1 * | 12/2003 | Whipple et al. ....... 235/462.01 |
| 2003/0236680 | A1 | 12/2003 | Holonbek |
| 2004/0010604 | A1 | 1/2004 | Tanaka et al. |
| 2004/0035922 | A1 | 2/2004 | Cameron |
| 2004/0035925 | A1 * | 2/2004 | Wu et al. .................... 235/380 |
| 2004/0039634 | A1 | 2/2004 | Cook |
| 2004/0059462 | A1 | 3/2004 | Norris et al. |
| 2004/0073495 | A1 | 4/2004 | Calaway et al. |
| 2004/0099741 | A1 * | 5/2004 | Dorai et al. ........... 235/462.08 |
| 2004/0117255 | A1 * | 6/2004 | Nemirofsky et al. .......... 705/14 |
| 2004/0117638 | A1 * | 6/2004 | Monroe ...................... 713/186 |
| 2004/0120016 | A1 * | 6/2004 | Burke ......................... 358/442 |
| 2004/0120547 | A1 | 6/2004 | Mampe et al. |
| 2004/0177003 | A1 * | 9/2004 | Liao et al. ..................... 705/14 |
| 2004/0206820 | A1 | 10/2004 | Melick et al. |
| 2005/0015310 | A1 * | 1/2005 | Frantz et al. .................. 705/26 |
| 2005/0029354 | A1 | 2/2005 | Frantz et al. |
| 2005/0029358 | A1 * | 2/2005 | Mankins ................ 235/462.46 |
| 2005/0044179 | A1 * | 2/2005 | Hunter ....................... 709/218 |
| 2005/0061887 | A1 | 3/2005 | Garrison |
| 2005/0082370 | A1 * | 4/2005 | Frantz et al. .......... 235/462.25 |
| 2005/0098632 | A1 | 5/2005 | Turvy et al. |
| 2005/0150944 | A1 | 7/2005 | Melick et al. |
| 2005/0224571 | A1 * | 10/2005 | Kelley et al. ................ 235/375 |

OTHER PUBLICATIONS

Marsh, Dave "Temporal Rate Conversion" http://www.microsoft.com/hwdev/TVBROADCAST/tempRate1.html, Dec. 27, 2000; 20 pages.

"Choosing A Bar Code" http://www.elfring.com/barcode.html, Dec. 23, 1999; 4 pages.

Product Profile: "Hand Held Bar Code Sanner" ScanPlus 1800 by Intermec Technologies Corporation, 2 pages.

"Motorola, Symbol Technologies, Connect Things and Airclic Form New Company to Drive the Growth of E-Commerce Through One-Scan Access to the Internet" by Symbol. 4 pages.

Welch Allyn Scanteam® 3400 Series, Laser Emulation, User's Guide, 1998, 27 pages.

* cited by examiner

METHOD AND APPARATUS FOR CAPTURING AND DECODING AN IMAGE OF A REMOTELY LOCATED BAR CODE

CROSS-REFERENCE TO RELATED APPLICATIONS

This application claims priority to U.S. Provisional Application, Ser. No. 60/572,140 filed May 18, 2004 which is entitled METHOD AND APPARATUS FOR CAPTURING AND DECODING AN IMAGE OF A REMOTELY LOCATED BAR CODE and is herein incorporated by reference.

BACKGROUND OF THE INVENTION

1. Field of the Invention

This invention relates generally to bar code technology, and more particularly to a method and apparatus for capturing a remotely located bar code using a phone camera, security camera, web camera, etc., displaying the captured image on a video display or other media, and scanning and decoding the image of the bar code for use in a variety of applications.

2. Problems in the Art

The use of bar code technology has proliferated as a means for efficient data collection. Generally, bar code technology allows for numbers, characters, or other symbols to be coded into a series of one-dimensional (1D) or two-dimensional (2D) spaced bars, as those terms are commonly known in the art. Currently a bar code scanner is used to capture the bar code pattern on the object, associated software decodes the bar code pattern, and the information from the decoded bar code pattern may be used as data and acted upon accordingly.

However, there are currently no known easy means for capturing the image of a remotely located video or printed bar code using a phone camera, web camera, security camera, etc., transmitting the image of a remotely located bar code over a network, displaying the remotely located bar code on a video display or printing the remotely located bar code, and scanning and decoding the remotely located bar code directly from the video display or off a printed media.

There is therefore an unfilled need for a method and apparatus which solves this and other problems.

SUMMARY OF THE INVENTION

Thus, it is a primary object, feature, or advantage of the present invention to provide a method and apparatus for bar code data interchange which overcomes the problems found in the prior art.

A further object, feature, or advantage of the present invention is to provide a method and apparatus for capturing a remotely located bar code with a security camera.

A still further object, feature, or advantage of the present invention is to provide a method and apparatus for capturing a remotely located bar code with a web camera.

Another object, feature, or advantage of the present invention is to provide a method and apparatus for capturing a remotely located bar code with a phone camera.

Yet another object, feature, or advantage of the present invention is to provide a method and apparatus for capturing a remotely located bar code with a digital camera connected to a network.

A further object, feature, or advantage of the present invention is to provide a method and apparatus for capturing a remotely located bar code with a camcorder connected to a network.

A still further object, feature, or advantage of the present invention is to provide a method to scan and decode a bar code directly from a video display of the remotely displayed bar code.

A further object, feature, or advantage of the present invention is to provide a method to scan and decode a bar code from a printed image of the remotely displayed bar code.

One or more of these and/or other objects, features or advantages of the present invention will become apparent from the following specification and claims.

According to one aspect of the invention a method for remotely decoding a bar code is provided. The method includes capturing an image of a bar code using a camera, transmitting the image of the bar code across a network, receiving the image of the bar code at a remote location on the network, reproducing the image of the bar code at the remote location to provide a reproduced image of the bar code, and scanning and decoding the reproduced image of the bar code. The step of reproducing can be on a display or on printed material. The method may further include sending security information (such as hash) to be displayed as a bar code and verifying that information extracted from the reproduced image of the bar code matches the security information.

According to another aspect of the invention, an apparatus for providing security via remote bar codes is provided. The apparatus includes a camera adapted for imaging a bar code, a computer remotely located from the camera, a network operatively connected between the camera and the computer, and a bar code reader operatively connected to the computer and adapted for scanning and decoding a reproduction of the bar code. The bar code reader can be implemented completely in software. There is software executing on the computer which is adapted for verifying that information obtained from the reproduction of the bar code matches stored information.

DETAILED DESCRIPTION OF THE PREFERRED EMBODIMENT

Figure 1:
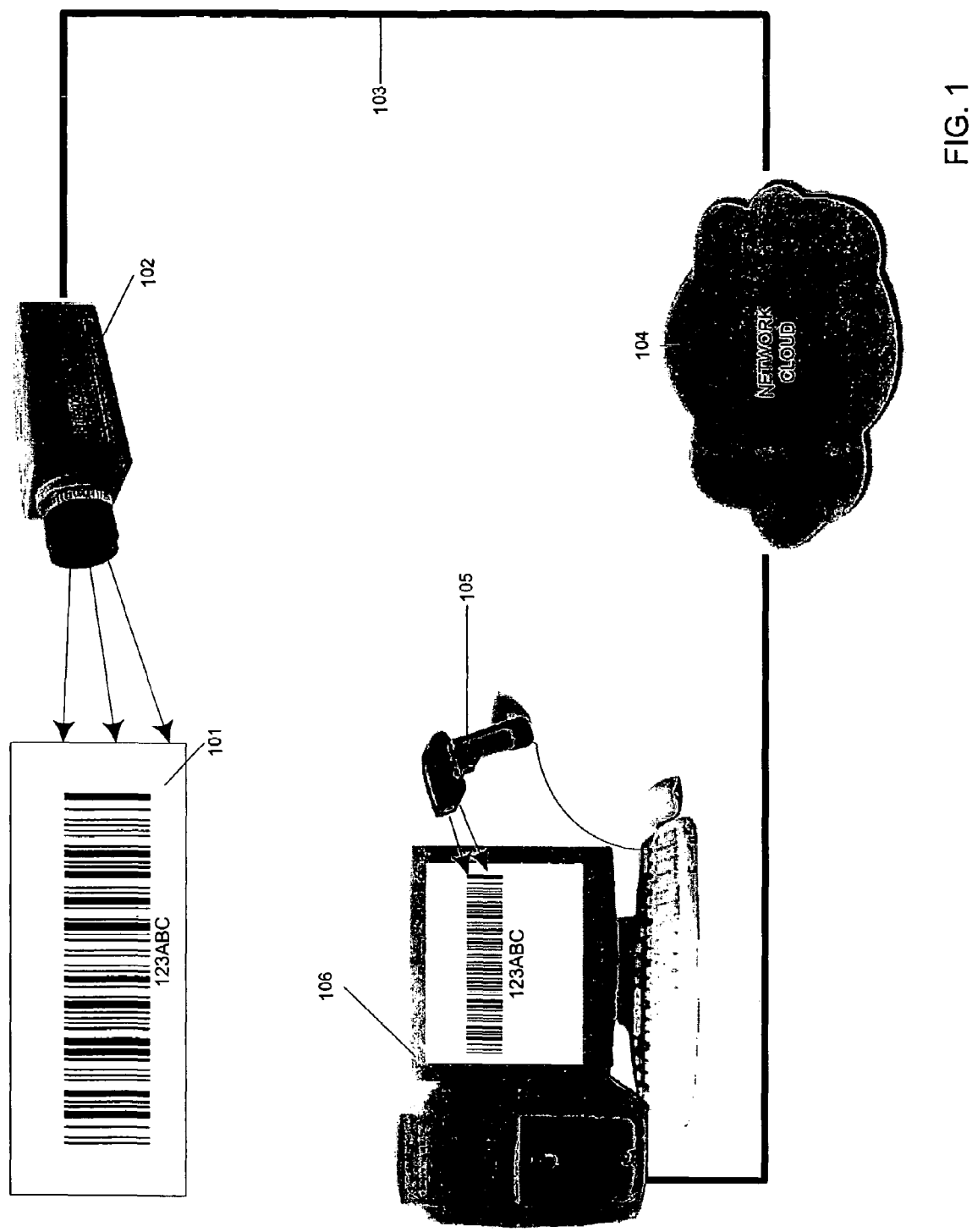
FIG. 1 is a diagram illustrating the basic components of the present invention.

The present invention is directed to a method and apparatus for bar code data interchange. In a preferred embodiment, a user will capture an image of a remotely located video or printed bar code through the use of a device such as, but not limited to, a security camera, web camera, phone camera, etc. The image of the remotely located bar code is transmitted over a hard-wired or wireless network, such as a LAN, WAN, PSTN, the Internet, cell phone or other wireless network, to a device such as, but not limited to a PC, cell phone, tablet, PDA, laptop, etc. The image of the remotely located bar code can be printed for scanning and decoding by a standard bar code reader, or alternatively can be scanned and decoded using a high scan rate CCD or linear imager directly from any video display such as, but not limited to, a television, laptop screen, tablet, PDA, cell phone, PC monitor, ATM display, cash register display, etc.

Printed Bar Codes

Printed bar codes are well known in the art, and are a proven, efficient means for data collection. A bar code is a coded image of bars and spaces, which can be used to represent numbers and other symbols. Printed bar codes can be 1Dimension (1D), or 2Dimension (2D). Common standardized 1D bar code formats include, but are not limited to, Code 39, Code 128, and Interleaved 2 of 5. A common standardized 2D bar code format includes, but is not limited to, PDF 417. There are also various proprietary 1D and 2D bar code formats. A bar code reader is used to read the printed bar code, and translates the image of the bar code into digital data.

Video Bar Codes

In addition to the use of printed bar codes as described in the present invention, bar codes may be captured directly from a video display, such as, but not limited to a PC monitor, PDA display, TV screen, digital camera, etc. Video bar codes are described in U.S. patent application Ser. No. 20020195495 to Melick, et al, entitled METHOD AND APPARATUS FOR BAR CODE DATA INTERCHANGE, and is herein incorporated by reference.

Video bar codes are an efficient means for data collection and can be 1Dimension (1D), or 2Dimension (2D). Common standardized 1D bar code formats that have been successfully read off a video display include, but are not limited to, Code 39, Code 128, and Interleaved 2 of 5. A common standardized 2D bar code format that has been successfully read off of a vide display includes, but is not limited to, PDF 417. A high scan rate CCD or linear imager bar code reader is used to read the video bar code, and translates the image of the bar code into digital data. One significant advantage of a video bar code is that is dynamic and can be changed.

Types of Bar Codes

The following is a list of various 1D and 2D printed bar codes that are commonly used in the world today that can also be read as a video bar code. This list includes, but is not limited to, Code 39 extended, Danish PTT 39 Bar code, French Postal 39 A/R, German Postal Bar code Identcode 11, German Postal Bar code Leitcode 13, 2 of 5 Industrial, 2 of 5 Matrix Plessey, Codabar, MSI Plessey, MSI Plessey+CHK10, MSI Plessey+CHK10+CHK10, MSI Plessey+CHK11+CHK10, 2 of 5 IATA, 2 of 5 Datalogic, Code 39 Reduced, USPS tray label, USPS sack label, Code32, Codabar Rationalised, MSI Plessey+CHK11, OMR, Code 93, Code 93 extended, 128 A, 128 B, 128 C, UCC-128, EAN/JAN-8, EAN/JAN-8+2, EAN/JAN-8+5, EAN/JAN-13, EAN/JAN-13+2, EAN/JAN-13+5, UPC-A, UPC-A+2, UPC-A+5, UPC-E, UPC-E+2, UPC-E+5, Océ UNICODE, 128 utoswitch, EAN 128, ISBN, ISSN, Swiss Postal, Code11, UPS Standard (18 digits), UPS 18 digits, UPS Standard (11 digits), UPS 11 digits, 128 X (Free Type), Telepen, PDF-417, PDF-417 (HP Mode), MicroPDF417, Royal Mail 4-State Customer Code, Dutch 4-State Postal, Singapore Post 4-State Postal Code, Australia Post 4-State Postal Code, Japan Post 4-State Postal Code, Australia Post 4-State Postal Code 37,52,67, Australia 4-state postal 37-CUST (HP Mode), Australia 4-state postal 52-FF-MET (HP Mode), Australia 4-state postal 67-FF-MET (HP Mode), Australia 4-state postal FCC-45 REPLY (HP Mode), Singapore Post 4-State Postal Code (HP Mode), DataMatrix, MaxiCode, MaxiCode (HP Mode), USPS FIM, POSTNET 5 ZIP+4, POSTNET 9 ZIP+4, POSTNET 11 DPC, PLANET, Aztec, Aztec Mesas, QR Code, Code 49, Channel Code, Code One, SuperCode, RSS, EAN/UCC Composite Symbology, Codablock F, Dot Code A, Code16K. There are also other various proprietary 1D and 2D bar code formats that can be read as a printed or video bar code.

Remote Bar Code Security

In order to provide an additional layer of security against fraud, the remote machine readable bar code and the human readable text that normally accompanies a machine readable bar code, which reflects the machine readable bar code, can deliberately be different. For example, the machine readable remote bar code might represent the alpha-numeric characters 1589AA, however the remote human readable alpha-numeric text associated with a particular remote machine readable bar code might intentionally read 1255BB on an identification card or badge, a ticket, etc. If the remote bar code was fraudulently created, it is likely the frauds would not check to see if the remote machine readable bar code matched the associated human readable alpha-numeric text. This is a low level of security that can be employed in the present invention. The remote bar codes' machine readable and associated human readable alpha-numeric text would be stored in a database, and when a security agent was viewing a remote machine readable bar code and corresponding human readable alpha-numeric text, both the scan of the remote machine readable bar code and the remote human readable alpha-numeric text would have to match what was stored in the database in order to gain entrance into a secure area, as an example.

Furthermore, a remote bar code can be made more secure when it is printed with a thermochromic ink, available from companies such as, but not limited to, Standard Register. Thermochromic ink changes color or disappears when warmed and returns back to the original color upon cooling, thus making it impossible to copy using photocopiers. Thermochromic ink bar codes are also difficult to counterfeit and can be authenticated at the point of audit without the need of specialized equipment. A remote bar code can be printed using a standard ink and a disappearing thermochromic ink in order to cause the remote bar code to morph into another image. The morphed bar code would translate into a different identification number and would alert auditors of potential fraud related to a specific high value asset. Thermochromic inks used in conjunction with remote bar codes and associated human readable alpha-numeric text are an effective deterrent to fraud.

In addition to a visible remote bar code, a separate invisible remote bar code can be printed on an identification badge. As an example, PhotoSecure, Inc. manufactures photoluminescent inks (SmartDYE.TM.) and related scanners. Fluorescing inks are invisible to the naked eye and provide a moderate amount of protection against copying. By mixing SmartDYE.TM. components, PhotoSecure can customize each ink batch, if necessary, to have unique fluorescing characteristics. These include the specific frequency of light needed to activate them, the manner in which their fluorescence fades when the photo stimulus is removed, the exact color of the fluorescence, and other properties which can be detected and measured by their scanners. PhotoSecure's scanners are equipped with a strobe light source, a CCD image sensor, and solid-state memory for recording both the response profile of each authentic secure remote bar code and any encoded data the remote bar code may contain.

Alternatively, an identification tag or badge, ticket, etc., may also include a digital watermark to provide another method of security for use with the present invention. Digimarc Corporation's digital watermark technology embeds a special message in an image by making subtle, imperceptible changes to the original data content of an image. A digital watermark on a remote bar code that has been fraudulently copied can be detected using a proprietary scanner.

Tagged Bar Codes

Remote bar codes, whether they are printed or scanned from a video display, can be tagged with data tags, which are useful for describing the data and interchanging the data with a back-end system. Tagged bar codes are described in U.S. Pat. No. 6,764, 009, filed May 30, 2002, entitled METHOD FOR TAGGED BAR CODE DATA INTERCHANGE, U.S. application Ser. No. 20030009350, filed May 30, 2004, entitled METHOD FOR TAGGED BAR CODE DATA INTERCHANGE, and U.S. application Ser. No. 20040206820, filed May 18, 2004, entitled METHOD FOR TAGGED BAR CODE DATA INTERCHANGE, all of which are herein incorporated by reference.

A more complete understanding of the method and apparatus for remotely viewed bar code data interchange will be afforded to those skilled in the art, as well as a realization of the additional features and advantages thereof, by a consideration of the following detailed description of the preferred embodiment. Reference will be made to the appended sheets of drawings which will first be described briefly.

FIG. 1 illustrates the basic components of the present invention. Bar code 101, which is encoded with the data "123ABC", is shown at a remote location. Bar code 101 may be either a printed or video bar code. Camera 102 in a remote location is used to capture an image of bar code 101. A security camera is shown, but could alternatively be a device such as, but not limited to a phone camera, web camera, television camera, camcorder, digital camera, etc.

Another example of a video camera system that can be used is the BGR Privacam System available from KpN. This is an example of an encrypted video system. A digital camera takes recorded images and divides them into a series of discrete information stream. These data streams are separated and sent to several different authorized recipients. This prevents unauthorized parties from intercepting video image transmission.

Camera 102 is operatively connected via connection 103 to network cloud 104. Connection 103 can be either a wireless or hard-wired connection. The network cloud 104 can be a personal area network (PAN), a local area network (LAN), wide area network (WAN), the public switched network (PSTN), a virtual private network (VPN), the Internet, a wireless network, a cell phone network, or any combination of the above.

The image of bar code 101 captured by camera 102 and transmitted via connection 103 over the network cloud 104 is received and processed for viewing by PC 106. A PC is shown, but alternatively could be a device such as, but not limited to a PDA, laptop PC, tablet, TV monitor, cell phone, etc. Generally, such a device is referred to as a computer.

Bar code scanner 105 is shown scanning the image of remote bar code 101. A high scan rate CCD or linear imager that is capable of reading a 1D or 2d video bar code is the Intermec ScanPlus™ 1800. This same scanner can also be used to read a 1D or 2D printed bar code.

Alternatively, the image of remote bar code 101 can be printed and read with any type of laser, CCD, or linear imager type bar code reader.

The following is a practical example of the present invention being used to gain access to a secure area in an airport.

In this example, bar code 101 is a video bar code being displayed on a cell phone or PDA at a remote location. A video bar code is dynamic and can be changed according to software instructions from an application running on the device displaying the video bar code, or from a back-end server, or PC connected via a hard-wired or wireless connection to a device operating in a remote location that is displaying a bar code 101 for capture by camera 102.

As an example, a worker trying to gain entrance into a secure area in an airport would approach a remote gate and make an entrance request via a land-line phone at the gate to the secured area. A security agent sitting at a remote location would answer the land-line phone. The worker trying to gain access to the secure area would be asked to enter their PIN number using the land-line phone at the gate of the secured area. A back-end software application or database would receive the PIN via a computer-telephone interface card to drive a hash algorithm. The resultant of the hash algorithm would be sent to the worker's cell phone and displayed as a bar code.

The security agent sitting at a remote location would scan the image of the video bar code that had just been sent to the worker's cell phone off of the PC screen. If the scan of the video bar code matched the resultant of the hash algorithm in the back-end database the security agent could unlock the gate into the secure area for the worker.

Additionally, another level of security would be available using the cell phone electronic identification codes associated with any cell phone. This includes the following numbers which are routinely transmitted over the control channel of the cell phone, 1) the electronic signature number (ESN) a 32 bit number programmed into the phone when its manufactured, 2) the mobile identification number (MIN) which is the 10 digit telephone number associated with the cell phone which is programmed into the phone at time of purchase, and 3) the system identification code (SID) which is a unique 5-digit number assigned to each carrier by the FCC and is also activated at the time of purchase. Any or all of these numbers could be queried and compared to the ones maintained in the database maintained by the airport security office in this example, or alternatively, this information could be checked in the background by the wireless carrier, or a third party.

Additionally, biometric security could be used in order as an additional level of security.

One skilled in the art will instantly recognize that this example is representative of many different applications for the viewing of a remote displayed printed or video bar code.

Having thus described a preferred embodiment and other embodiments of a method and apparatus for viewing of a remotely displayed printed or video bar code, and the scanning of a transmitted image of the remotely displayed bar code it should be apparent to those skilled in the art that certain advantages of the present invention have been achieved. It should also be appreciated that various modifications, adaptations, and alternatives may be made. It is of course not possible to describe every conceivable combination of components for purposes of describing the present invention. All such possible modifications are to be included within the spirit and scope of the present invention which is to be limited only by the following claims.

What is claimed is:

1. A method for remotely decoding a bar code for security purposes, comprising:

sending security information to be displayed as the bar code;

capturing an image of the bar code using a camera;

transmitting the image of the bar code across a network;

receiving the image of the bar code at a remote location on the network;

reproducing the image of the bar code on a video display at the remote location to provide a reproduced image of the bar code;

scanning and decoding the reproduced image of the bar code from the video display using a bar code reader operated by a user to provide information; and verifyng the information extracted from the reproduced image of the bar code matches the security information.

2. The method of claim 1 wherein the camera is selected from the set consisting of a phone camera, a security camera, a camcorder, a digital camera, and a web camera.

3. The method of claim 1 wherein the bar code is a 2D bar code.

4. The method of claim 1 wherein the bar code is a 1D bar code.

5. The method of claim 1 wherein the bar code comprises a human readable text portion and a machine readable bar code portion.

6. The method of claim 5 wherein the human readable text portion does not match the machine readable bar code portion to provide increased security.

7. The method of claim 1 wherein a digital watermark is associated with the bar code.

8. The method of claim 1 wherein the bar code is a tagged bar code.

9. The method of claim 1 wherein the step of reproducing the image is reproducing the image on a display at the remote location.

10. The method of claim 1 wherein the step of reproducing the image is printing the image at the remote location.

11. A method of providing security through remote use of a bar code, comprising:

sending security information to be displayed as a bar code over a first communication link;

displaying an image of the bar code;

capturing the image of the bar code using a camera;

transmitting the image of the bar code to a remote location;

receiving the image of the bar code at the remote location, the remote location being remote from the camera;

reproducing the image of the bar code on a video display at the remote location to provide a reproduced image of the bar code;

scanning and decoding the reproduced image of the bar code from the video display using a bar code reader operated by a user to provide decoded information from the reproduced image of the bar code; and verifying that the security information sent matches the decoded information from the reproduced image of the bar code.

12. The method of claim 11 further comprising granting physical access to a secured site after the step of verifying.

13. The method of claim 11 wherein the step of sending information is sending a hash code.

14. The method of claim 11 wherein the step of sending information is sending information to a cell phone.

15. The method of claim 14 wherein the camera is a security camera.

16. The method of claim 14 further comprising verifying a cell phone electronic identification code of the cell phone.

* * * * *